(12) United States Patent
Osborne et al.

(10) Patent No.: US 7,997,538 B2
(45) Date of Patent: Aug. 16, 2011

(54) AERODYNAMIC FAN CONTROL EFFECTOR

(75) Inventors: Bradley A. Osborne, Manchester, MO (US); Scott L. Schwimley, Foristell, MO (US)

(73) Assignee: The Boeing Company, Chicago, IL (US)

( * ) Notice: Subject to any disclaimer, the term of this patent is extended or adjusted under 35 U.S.C. 154(b) by 188 days.

(21) Appl. No.: 12/047,489

(22) Filed: Mar. 13, 2008

(65) Prior Publication Data

US 2009/0230240 A1   Sep. 17, 2009

(51) Int. Cl.
*B64C 23/06* (2006.01)

(52) U.S. Cl. .............. 244/199.4; 244/206; 244/90 R

(58) Field of Classification Search ............. 244/199.4, 244/206, 90 R, 204, 90 A, 91
See application file for complete search history.

(56) References Cited

U.S. PATENT DOCUMENTS

| | | | | |
|---|---|---|---|---|
| 2,549,044 A * | 4/1951 | Ashkenas et al. | ........... | 244/90 A |
| 2,768,801 A * | 10/1956 | Rauth et al. | .................. | 244/90 A |
| 4,017,041 A * | 4/1977 | Nelson | ........................... | 244/198 |
| 4,247,063 A * | 1/1981 | Jenkins | ........................... | 244/91 |
| 6,095,459 A * | 8/2000 | Codina | ......................... | 244/213 |
| 6,123,296 A * | 9/2000 | Mangalam | ..................... | 244/204 |

* cited by examiner

*Primary Examiner* — Christopher P Ellis
(74) *Attorney, Agent, or Firm* — NovaTech IP Law; Charles S. Gumpel

(57) ABSTRACT

A fan control effector for an aircraft comprises at least one blade configured to be pivotably deployable in a radially outward direction from a retracted position to a deployed position such that the blade extends out of the aircraft. The fan control effector may be mounted in a symmetrical arrangement about a longitudinal axis on opposing wings of the aircraft. Furthermore, the fan control effector may comprise any number of blades for independent deployment outwardly from the wing. The blades are configured to be angularly deployable along a direction that is non-parallel to the longitudinal axis of the aircraft. The blades may be configured to be deployable sequentially from the wing starting with an initial deployment of an aft-most one of the blades.

17 Claims, 3 Drawing Sheets

AERODYNAMIC FAN CONTROL EFFECTOR

CROSS-REFERENCE TO RELATED APPLICATIONS (Not Applicable)

STATEMENT RE: FEDERALLY SPONSORED RESEARCH/DEVELOPMENT (Not Applicable)

FIELD

The present invention relates generally to aircraft control systems and, more particularly, to a fan control effector that is configured to be radially outwardly deployable such as from an aircraft wing in order to generate yaw moment about the aircraft.

BACKGROUND

Tailless aircraft provide certain advantages over conventional aircraft such as improved aerodynamic efficiency due to reduced aerodynamic drag as well as reduced weight and size. Other advantages of tailless aircraft include low radar visibility due, at least in part, to the geometric configuration of the aircraft. As is suggested by the name, tailless aircraft lack certain control surface arrangements typical of conventional aircraft such as aft-fuselage mounted tail sections for carrying a conventional elevator and/or stabilizer or a conventional tail fin and rudder.

In the absence of such conventional tail sections, tailless aircraft may employ alternative control surfaces mounted on an aft portion of the wing in order to provide direction control to the aircraft. Included among the types of control forces required for an aircraft is yaw control. More specifically, yaw control or the ability to generate a yawing moment about the aircraft is typically desired for efficient turning control during flight.

In order to generate the necessary yaw moment required for certain turning maneuvers, some tailless aircraft may employ spoilers and/or split ailerons (i.e., spliterons) on the aircraft wing. Spoilers, spliterons and other alternative control surfaces may also be employed for speed control of tailless aircraft. Although the employment of spoilers and other devices has been effective in providing yaw control on tailless aircraft, the use of such devices presents certain drawbacks and deficiencies which detract from their overall utility for yaw control.

For example, the forces that are required to actuate a spoiler or a spliteron control surface are typically directed against the force of the air stream that is passing over the wing. As such, the actuating mechanisms for spoilers and spliterons themselves must be capable of applying the relatively large deployment forces and are therefore typically large, bulky, complex, and heavy. In addition, such actuating mechanisms may consume large amounts of energy for deployment of the control surfaces at certain flight conditions.

A further drawback associated with spliterons is related to the relatively thin cross-sectional profile at the trailing edge of the wing where spliterons are typically located. Because of the relatively thin profile, packaging of the actuating mechanism for the spliteron presents design challenges. The use of spoilers presents other inherent drawbacks. For example, for spoilers that are mounted at a mid-chord position on the wing, the deployed spoiler may generate a disruption or separation in the airflow passing over the wing. In this regard, spoilers may produce significant interference with flaps, ailerons and other downstream control surfaces due to the creation of separated flow in their wake.

In addition, the separated flow produced by the spoiler diminishes the downstream control surface effectiveness and, furthermore, may result in an increase in buffet loads on the aircraft. As a result, tailless aircraft which employ spoilers for yaw control may require trailing edge devices having increased surface area as compensation for their reduced effectiveness in the wake of the deployed spoiler. Unfortunately, an increase in the surface area of the trailing edge device correlates to an increase in mass which, in turn, translates to an increase in the structural loads that are imposed upon the airframe.

Thrust vector control is another mechanism that has been employed on tailless aircraft as a means for imparting yaw moment or directional control of the aircraft via the propulsion unit or units. Thrust vector control mechanisms requires the use of thrust vectoring devices which, in some arrangements, typically necessitates the use of independently controllable throttles on two separate propulsion units. Alternatively, thrust vector control may be implemented with the appropriate ducting from a single propulsion unit.

Unfortunately, arranging the propulsion system to provide the aircraft with yaw control imposes several inherent drawbacks. For example, thrust vector control is throttle-dependent such that any achievable yaw control is necessarily proportional to the propulsive thrust capabilities. As such, in the event of engine failure or low engine thrust output, ineffective flight control or yaw control may result at critical times such as during low throttle operations typical of approaches and landings. Furthermore, the implementation of thrust vector control on any aircraft is typically heavy, complex and requires the use of hardware that is capable of withstanding high engine temperatures. A further drawback associated with thrust vector control is that some of the components may be located far aft on the aircraft such that ballast (i.e., dead weight) must be added in order to maintain the vehicle's center of gravity within an acceptable range.

A further drawback associated with the use of spoilers and/or spliterons on tailless aircraft is related to the separated flow over the wing that occurs at high angles of attack. Although such control surfaces may be effective in imparting the necessary yaw, pitch and/or roll control during most flight conditions, such control surfaces may lose their effectiveness due to separation of the flow over the wing at high angles of attack. Furthermore, the extent of the separated flow tends to increase near the trailing edge where the control surfaces are typically located. In this regard, these control surfaces may be rendered ineffective for yaw and/or speed control during high angle of attack conditions.

As can be seen, there exists a need in the art for a system and method for imparting yaw control to an aircraft which is effective through a wide range of flight conditions. In this regard, there exists a need in the art for a system and method of yaw control of an aircraft that is effective at high angles of attack. Furthermore, there exists a need in the art for a yaw control mechanism which minimizes the amount of downstream wing surface area affected by separated flow in the wake of the deployed mechanism.

In addition, there exists a need in the art for a yaw control mechanism that is deployable with minimal actuation forces and which operates with increased yaw efficiency relative to conventional control surfaces. In this regard, there exists a need in the art for a system which minimizes and reduces buffet loads and associated structural airframe requirements as a result in the minimization of separated flow. Finally, there exists a need in the art for a yaw control mechanism which is of simple construction, low cost and low weight.

BRIEF SUMMARY

The present invention specifically addresses the above-described needs associated with control systems for aircraft such as tailless aircraft by providing a fan control effector which, in one embodiment, may be used for generating yawing moment about the aircraft. The technical effects of the invention include at least one and, more preferably, a plurality of blades which are radially outwardly deployable and which represent an improvement over conventional yaw control systems traditionally comprised of spoilers, spliterons and other devices.

The fan control effector may be employed to generate yawing moment about the aircraft as a substitute for other yaw control devices such as spoilers which are conventionally employed on aircraft. In this regard, the fan control effector provides aerodynamic yawing for an aircraft to augment and/or replace that which is conventionally obtained through conventional tail surfaces such as tail fins and/or rudders. In addition, the fan control effector advantageously provides aerodynamic yaw control at high angles of attack where a conventional vertical tail rudder may be ineffective. The fan control effector provides a solution for yaw control on tailless aircraft over that which is obtained with varying degrees of success with propulsive thrust control, split ailerons (i.e., spliterons) and spoilers.

The fan control effector comprises at least one and, more preferably, a plurality of blades which are configured to be pivotably or rotatably deployed from the aircraft wing. Although illustrated in the figures as being generally elongate and/or rectangular shaped, the blades may be provided in any shape, size and configuration. It should also be noted that the fan control effector may comprise a single blade provided in any shape or size and which is configured to be deployable radially outwardly from a retracted position to a deployed position such that the blade extends out of the aircraft. In this regard, the blades extend preferably out of the upper-most surface of the wing and into the oncoming main flow passing over the wing.

In one embodiment, each of the blades may be configured to pivot about a pivot axis. The pivot axis may be oriented such that the blades rotate along an angular direction that is non-parallel with the main flow stream passing over the wing. For example, the pivot axis may be oriented such that the blades rotate through a plane that is substantially perpendicular relative to the longitudinal axis of the aircraft. However, the pivot axis may be oriented such that the plane of rotation of the blades is oriented in any direction including a direction that is parallel to the longitudinal axis of the aircraft.

In one embodiment, the fan control effector blades are configured to be stowed within a bay of an airfoil or other aerodynamic member such as within the wing of an aircraft. The blades of the fan control effector may be deployed into the airstream by rotating about a common pivot axis or pivot point. In one deployment position, the blades may be spread apart in a fanned arrangement in order to maximize the net area of the blades that are exposed to the oncoming main flow. In another deployment scenario, the blades for the fan control effector may be oriented in stacked arrangement, one behind the other, in order to minimize or reduce the amount of net area to the oncoming main flow.

Preferably, the fan control effector may be positioned on an outboard side of the wings such as adjacent a wing tip and preferably at a mid-chord location in order to facilitate packaging and stowage within the relatively thicker portion of the wing. In this regard, locating the fan control effector at or near the mid-chord location may simplify integration into the wing while freeing up space on the leading and trailing edges for alternative control surface devices. The fan control effector may be configured to be deployable from an upper side or a lower side of the wing or any combination thereof. Furthermore, the fan control effector may be mounted on the aircraft in symmetrical arrangement on each of the opposing wings.

Each of the blades may be configured to be independently deployable in a radially outward direction from the aircraft wing starting from a stacked arrangement in the stowed position within the bay. Due to the pivotal deployment out of the wing in a direction that is preferably perpendicular to the main flow, actuation loads for the fan control effector are reduced relative to conventional pivoting control surfaces such as spoilers and spliterons which are actuated in opposition to the main flow. Advantageously, the actuation mechanism for the fan control effector may be of reduced size, weight, complexity and consume a relatively small amount of energy for deployment.

Regarding the spanwise positioning of the fan control effector, location thereof on an outboard portion of the wing such as adjacent the wing tip allows for a maximization of the geometrical yaw moment arm as measured from the vehicle center of gravity. Furthermore, the fan control effector may decrease the amount of wing surface area that is affected by the separated flow in the wake of the blades. In this regard, the fan control effector may minimize the buffet loads otherwise imposed on the airframe.

Even further, the fan control effector may minimize the adverse effects on downstream control surfaces such as flaperons, elevons and spliterons by reducing the amount of wing area that is affected by the wake otherwise created by upstream spoilers, especially at high angles of attack. Importantly, the fan control effector, in the embodiments disclosed herein, provides effective yaw control at high angles of attack where other conventional control surfaces such as trailing edge control surfaces may lose their effectiveness. The fan control effector is not limited to tailless aircraft but may be employed on conventional aircraft for addressing the loss of effectiveness suffered by conventional vertical and horizontal tail surfaces at high angles of attack such as may occur during low speed maneuvering.

In addition, the fan control effector may reduce the overall cost of new air vehicles by improving aerodynamic design efficiency, flexibility and performance as well as allowing for a reduction in weight and an increase in fuel efficiency. Although described with reference to integration on a tailless aircraft, it is recognized herein that the fan control effector may be implemented on any air vehicle including, but not limited to, conventional aircraft such as unmanned air vehicles (UAV) and missiles. In this regard, for relatively small and deployable or inflatable aerodynamic surfaces typically unsuitable for mechanical control surface devices, the present invention may be implemented thereon to provide yaw moment for flight control ability.

BRIEF DESCRIPTION OF THE DRAWINGS

The features of the present invention will become more apparent upon reference to the drawings wherein like numerals refer to like parts throughout and in which.

DETAILED DESCRIPTION

Figure 1:
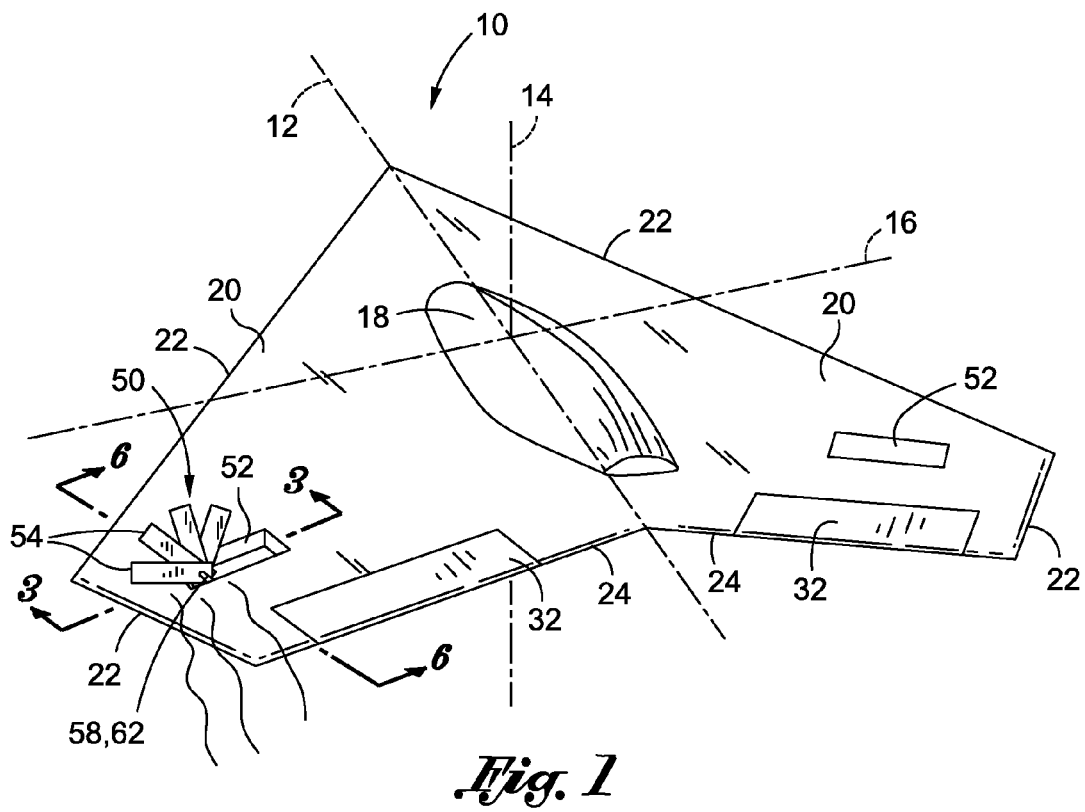
FIG. 1 is a perspective illustration of an aircraft having a fan control effector disposed on a pair of wings and further illustrating one of the fan control effectors in a deployed position.

Referring now to the drawings 20 wherein the showings are for purposes of illustrating the various and preferred embodiments of the invention only and not for purposes of limiting the same, FIG. 1 is a perspective rear illustration of an aircraft 10 having an embodiment of a fan control effector 50 disposed on a pair of wings 20. The exemplary aircraft 10 upon which the fan control effector 50 is installed is shown as a tailless aircraft 10 having a pair of opposing wings 20. The tailless aircraft 10 may include a fuselage and/or body 18 which may be integrated with the wings 20. The aircraft 10 illustrated in FIG. 1 includes a longitudinal axis 12 extending along the forward and aft directions of the aircraft 10 with a vertical axis 14 and horizontal axis 16 being oriented orthogonally relative to the longitudinal axis 12 as shown.

The aircraft 10 is shown as having a swept-wing 20 configuration with a pair of control surfaces such as elevons (i.e., combination elevator and aileron) and/or flaps as may be provided for control of the aircraft 10. However, any number of alternative control surfaces may be provided with the aircraft 10 and in any configuration and using any number of a variety of actuation mechanisms. Although the aircraft 10 onto which the fan control effector 50 is implemented is illustrated as a tailless aircraft 10, the fan control effector 50 may be implemented on a variety of different types of aircraft 10 including conventional aircraft 10 having conventional vertical and/or horizontal tail surfaces mounted on an aft end of a conventional fuselage. In this regard, it is contemplated that such conventional aircraft 10 may employ the fan control effector 50 described herein as a speed control device or for other flight control purpose including yaw control.

Referring still to FIG. 1, the fan control effectors 50 are illustrated as being disposed on an outboard edge of each of the wings 20 of the aircraft 10 in a symmetrical arrangement about the longitudinal axis 12. However, it is contemplated that the fan control effectors 50 may be installed at any location (i.e., inboard or outboard) along the span of the wing 20 and in any type of symmetric or asymmetric arrangement. Furthermore, the fan control effectors 50 may be positioned in any position along a chord of the wing 20 between the leading and trailing edge 24, 26. However, the arrangement shown in FIGS. 1 and 2 wherein the fan control effectors 50 are disposed adjacent to the wing tips 22 and at a mid-chord position of the wing 20 is preferable in that the depth of the wing section at mid-chord provides a thicker section within which to package the fan control effector 50. In addition, the mid-chord installation of the fan control effector 50 may minimize interference with other wing structure or with components mounted within the wing 20.

Figure 2:
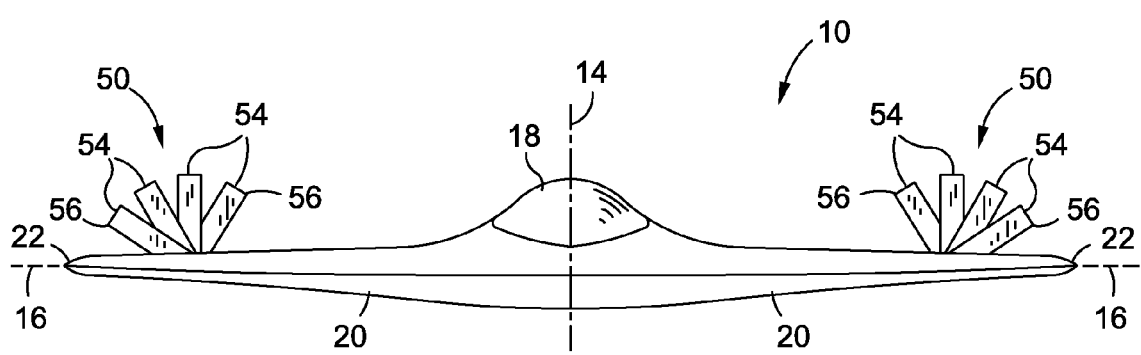
FIG. 2 is a front view of an aircraft of FIG. 1 illustrating a pair of the fan control effectors in the deployed position.

Referring briefly to FIG. 2, shown is a front view of the aircraft 10 having the fan control effectors 50, in one embodiment, disposed symmetrically on opposing sides of the aircraft 10. As can be seen, the fan control effectors 50 may each include a plurality of blades 54 which are illustrated as being deployed in an exemplary fanned arrangement. In the fanned arrangement of FIG. 2, the blades 54 are deployed so as to extend into the oncoming freestream or main flow 36 of air passing over the wing 20. In this manner, the fan control effector 50 produces an aerodynamic yawing moment for the aircraft 10 in order to augment or replace the yawing moment that would otherwise be provided by conventional control surfaces.

Figure 4:
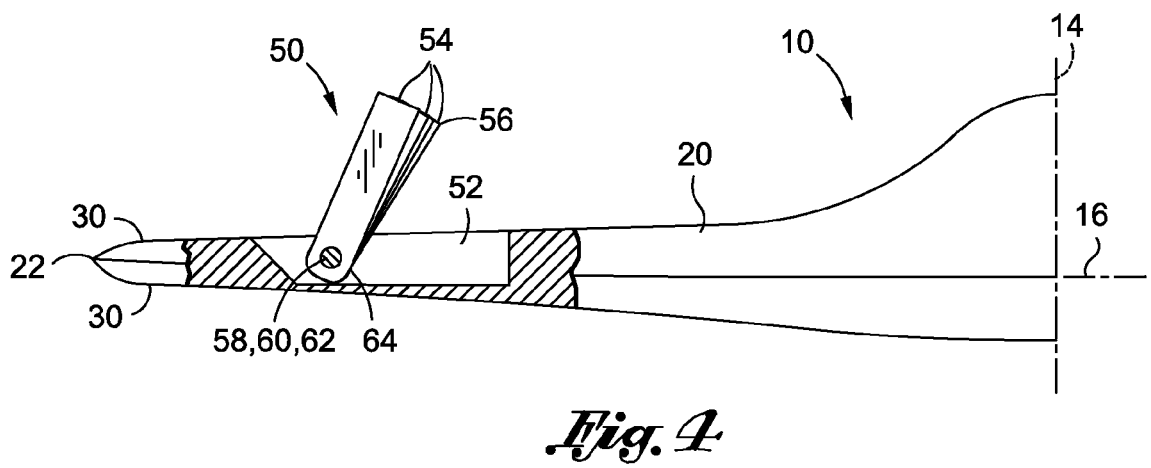
FIG. 4 is a front view one of the aircraft wings illustrating the deployed blades of the fan control effector in a stacked arrangement.
Figure 5:
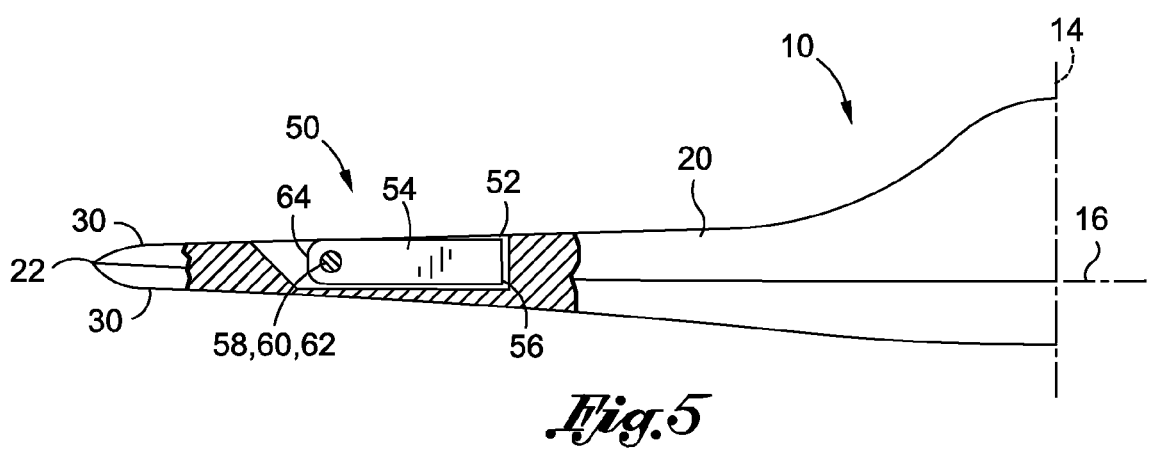
FIG. 5 is a front view one of the aircraft wings illustrating the fan control effector in a stowed position.

Importantly, the fan control effector 50 includes at least one blade 54 which is shown as being pivotally deployable in a radially outward direction from the retracted position. The blade 54 may be deployed starting from the retracted position as shown in FIG. 5 to a deployed position shown in FIGS. 3 and 4. In the deployed positions, the blades 54 extend out of the aircraft wing 20 and produce the aerodynamic yawing moment. Although the fan control effector 50 is shown as having four (4) blades 54, any number may be provided and in any configuration, size and/or shape. As was already mentioned, the blades 54 are configured to be deployed radially outwardly and, in this regard, may be configured to pivot about the pivot axis 58. In one embodiment, the blades 54 of the fan control effector 50 are preferably configured to pivot outwardly through a plane that may be oriented in a non-parallel direction relative to the main flow 36. In a preferable embodiment, the pivot axis 58 is oriented substantially parallel relative to the longitudinal axis 12 although any orientation of the pivot axis 58 may be provided.

Figure 3:
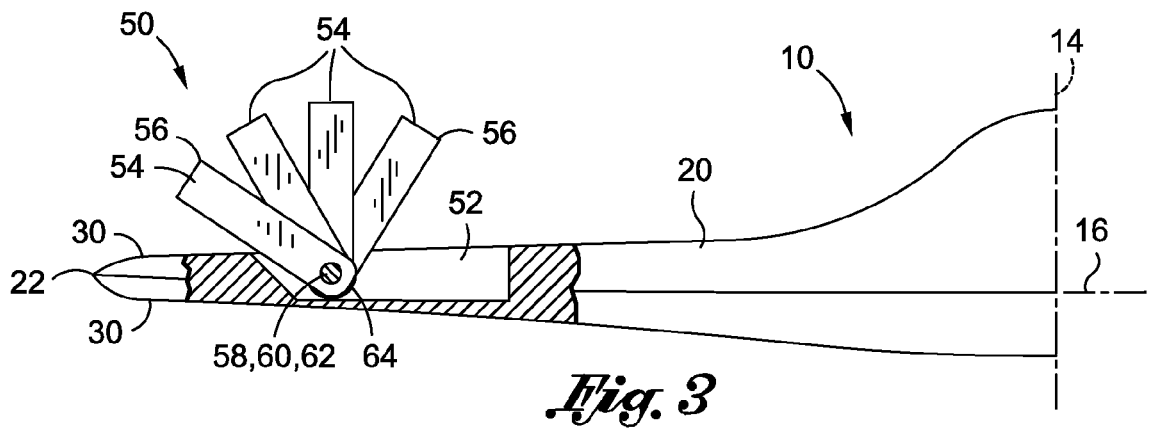
FIG. 3 is a front view of one of the aircraft wings having the fan control effector blades deployed in a fanned arrangement.

It should also be noted that although the blades 54 are shown as being deployable outwardly from a common pivot axis 58, each of the blades 54 may be deployed from its own individual pivot point 60 or pivot axis 58 which may or may not be coaxial with the pivot axes for the remaining blades 54. Even further, it should be noted that although FIGS. 3-5 illustrate the blades 54 as being pivoted about a static or non-movable pivot axis 58, it is contemplated that an articulated pivot axis 58 may be provided such that, upon deployment, the pivot axis 58 may be initially moved upwardly or outwardly relative to the wing 20 whereafter the blades 54 may be pivotally deployed radially outwardly. By providing an articulated pivot axis 58, the blades 54 may obtain a greater reach into the main flow 36 for improved aerodynamic yaw control.

It should also be noted that although the fan control effector 50 is shown as being deployable from an upper side of the wing 20, the fan control effector 50 may be mounted so as to be deployable from either an upper and/or a lower side of the wing 20. Even further, the fan control effector 50 may be mounted on any airfoil and is not limited solely to implementation on an aircraft wing 20. In this regard, the fan control effector 50 may additionally be mounted on various airfoil devices such as conventional flight control surfaces as well as on alternative devices such as on canards and other aerodynamic surfaces of an air vehicle, including fuselage and body 18 surfaces.

The fan control effector 50 may be applied to other air vehicles in addition to aircraft 10 including, but not limited to, missiles and other flying vehicles. In a missile configuration, it is contemplated that the fan control effector 50 may be deployed on a body 18 of the missile such that the blades 54 of the fan control effector 50 are configured to reach or extend outwardly into the flow of air. An exemplary missile vehicle upon which the fan control effector 50 may be employed is a cruise missile. In this regard, it should be noted that the fan control effector 50 may be applied to anything that is configured to be airborne and which requires yaw control and/or speed control.

Referring briefly again to FIGS. 3-5, shown is the fan control effector 50 in various stages of deployment. More specifically, FIG. 3 illustrates the blades 54 of the fan control effector 50 deployed in a fanned arrangement for maximum effectiveness. The blades 54 are pivoted about a pivot axis 58 which may be embodied as a trunnion 62 which may act as the pivot point. The blades 54 are shown deployed outwardly from a bay 52 which may have a tailored geometry in order to maximize the angular deployment capability of the blades 54. For example, as shown in FIG. 3, the leftmost blade 54 is shown deployed at an angle requiring complementary contouring of an outboard side of the bay 52.

Referring now to FIG. 4, shown are the blades 54 of the fan control effector 50 in a stacked arrangement for a reduced net area that is exposed to the main flow 50. In this regard, the fan control effector 50 shown in the stacked arrangement of FIG. 4 has a reduced effectiveness with a concomitant reduction in yawing force as compared to the fanned arrangement illustrated in FIG. 3. In this regard, the stacked arrangement of FIG. 4 may be desirable for minimizing the amount of separated flow 38 generated in the wake of the blades 54. Such stacked arrangement shown in FIG. 4 may be desirable for reducing buffet loads that may be otherwise imposed upon the airframe.

Referring to FIG. 5, shown is the fan control effector 50 with the blades 54 in a stowed condition in the bay 52. As was earlier mentioned, a separate flap or door (not shown) may be provided to enclose the bay 52 following stowage of the retracted blades 54 therewithin. Such door or flap may preserve the aerodynamics of the wing 20 by providing continuity of the outer mold line 30 surface of the wing 20.

In addition, the fan control effector 50 is shown in a preferable location on the outboard side of the wing 20 such as adjacent the wing tip 22. Outboard positioning of the fan control effector 50 may minimize the adverse effects that may otherwise be imposed on downstream control effectors such as flaps that are typically located adjacent the inboard side of the wing 20. In this regard, such outboard positioning may reduce the area of the trailing edge 26 are that may be affected by the separated flow 38 generated by deployment of the blades 54.

Regarding the configuration of the blades 54, although the elongate, generally flat, rectangular configuration is shown, the blades 54 may be provided in any size, shape, and/or configuration. Due to the high drag characteristics exhibited by flat objects, such configuration is believed to be desirable while allowing for simplicity of construction and reduced complexity. However, it should be noted that the shape and size of the blade 54 configuration may be optimized for a given airframe platform and/or for flight regimes of such airframe platform.

Advantageously, the fan control effector 50 is configured to allow for deployment of the blades 54 from the retracted position to the deployed position in an angular orientation and in a direction that is preferably substantially perpendicular relative to the oncoming main flow 36 of air which is passing over the wing 20. Because of the non-parallel orientation relative to the main flow 50, the fan control effector 50 provides for reduced actuation forces as compared to conventional control surfaces which typically pivot outwardly against the main flow 50 during actuation. Therefore, the fan control effector 50 allows for reduced actuation forces with an attendant reduction in the size, complexity and energy consumption of such actuation mechanisms 64.

Figure 6:
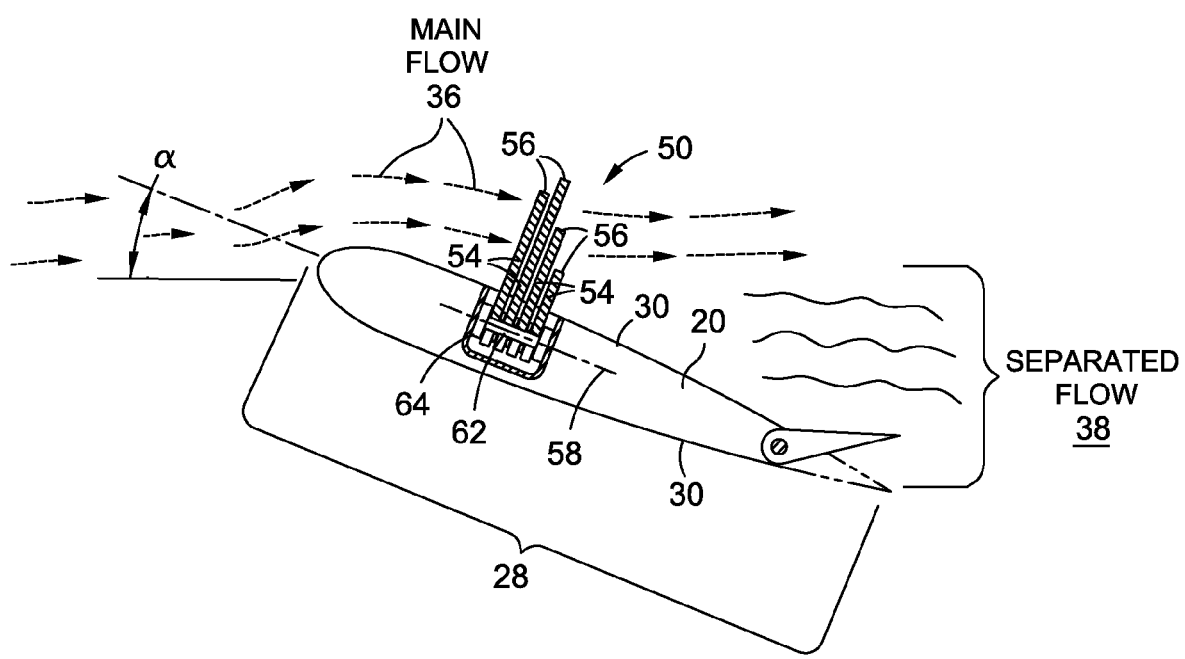
FIG. 6 is a sectional illustration taken along lines 6-6 of FIG. 1 and illustrating the fan control effector in a deployed condition with the aircraft wing being oriented at a high angle attack and further illustrating a separated flow blanketing a control surface (e.g., aileron) disposed at a trailing edge of the wing.

Regarding actuation and referring briefly to FIG. 6, the blades 54 of the fan control effector 50 may be configured to be individually deployable in a radially outward manner from the retracted position to the deployed position such that the blades 54 extends out of the wing 20. Furthermore, the blades 54 may be configured to be either sequentially deployable or deployable as a unit or in sets. In a preferable arrangement, the sequential deployment of the blades 54 may comprise an initial deployment of an aft-most one of the blades 54 as may be illustrated in FIG. 3 taken as a view looking forward at the aircraft 10.

As can be seen in FIG. 3, the left-most blade 54 of the fan control effector 50 is shown deployed at the greatest angular position with the next adjacent blade 54 being disposed in a lesser angular position followed by successively lesser angles of deployment for the subsequent blades 54. The initial deployment of the aft-most blade 54 is believed to be desirable in order to minimize interference which may be caused by the main flow 50 bending the blade 54 backwardly and which may otherwise interfere with subsequent blade 54 deployment. Alternatively, the forward-most one of the blades 54 may be initially deployed or any of the intermediate blades 54 (i.e., between the forward-most and aft-most blades 54) being initially deployed and/or retracted.

The blades 54 may be rotated into the main flow 36 to the degree required to vary the yawing moment about the aircraft 10. In this regard and referring still to FIGS. 3 to 5, the relative area that is exposed to the main flow 36 may be altered by the degree of alignment between the blades 54. For example, FIG. 3 illustrates a maximum net area exposed to the main flow 36 in order to maximize the yawing moment of the blades 54 in the fanned arrangement. Alternatively, a reduced amount of area may be exposed to the main flow 36 in order to regenerate a reduced amount of yawing moment by collapsing the blades 54 into a stacked arrangement, as shown in FIG. 4. Yaw control may be varied by altering the projected blade 54 area of one wing 20 while increasing or decreasing the projected blade 54 area of the opposing wing 20. The yawing direction may be altered by reversing the projected blade 54 areas.

The fan control effector 50 may also be utilized for speed control wherein the blades 54 act as a speed break. In this arrangement, the blades 54 of each fan control effector 50 on each wing 20 may be symmetrically deployed. In this regard, the fan control effector 50 may be provided for yaw control as well as for speed control which may allow for elimination of other control surface 32 devices such as flaps. Furthermore, the fan control effector 50 may be deployed symmetrically on each wing 20 to modulate pitching moment of the aircraft 10. In addition, the fan control effector 50 may be deployed symmetrically on each wing 20 in order to increase trimmed lift when the device is used in conjunction with other control surface 32 devices.

Importantly, the blades 54 of the fan control effector 50 are configured such that their aerodynamic center of effectiveness is located further off the outer mold lines 30 of the wings 20 and further outboard on the wing 20 as compared to conventional control surface 32 devices. In this regard, the outward and upward positioning of the aerodynamic center of effectiveness of the fan control effector 50 allows for a decrease in the otherwise adverse effects on trailing edge 26 control surfaces 32. Significantly, an outboard location of the aerodynamic center of effectiveness of the fan control effector 50 results in an increase in yaw effectiveness.

Referring again to FIG. 6, at high angles of attack to the relative wind 34, the main flow 36 tends to separate from the wing 20 such that a separated flow 38 is produced in an area wherein the conventional trailing edge 26 devices are located. In this regard, the fan control effector 50 may be advantageously employed to produce yawing control at high angles of attack by deployment of the blades tips 56 out of the separated flow 38.

The above description is given by way of example and not limitation. Given the above disclosure, one skilled in the art could devise variations that are within the scope and spirit of the invention disclosed herein. Furthermore, the various features of the embodiments disclosed herein can be used alone or in any varying combinations with each other and are not intended to be limited to the specific combinations described herein. Thus, the scope of the claims is not to be limited by the illustrated embodiments.

What is claimed is:

1. A fan control effector for an aircraft having at least one wing, comprising:
    a plurality of blades deployable radially outwardly from a retracted position to a deployed position such that the blades extend out of the aircraft wings;
    the blades being deployable about a common pivot axis oriented substantially parallel to a longitudinal axis of the aircraft;
    the deployed blades being movable between a fanned arrangement and a stacked arrangement in a manner to vary a yawing moment of the aircraft.

2. The fan control effector of claim 1 wherein the aircraft includes a pair of wings each having a fan control effector mounted thereon in symmetrical arrangement about the longitudinal axis.

3. The fan control effector of Claim 1 wherein the blades are configured to be deployable from at least one of an upper and a lower side of the wing.

4. The fan control effector of claim 1 wherein:
    the blades are independently deployable radially outwardly from the aircraft wing.

5. The fan control effector of claim 4 wherein the blades are deployable sequentially from the wing.

6. The fan control effector of claim 5 wherein the sequential deployment of the blades comprises an initial deployment of an aft-most one of the blades.

7. The fan control effector of claim 1 wherein the aircraft is a tailless aircraft.

8. An aircraft, comprising:
    an airfoil including;
        a plurality of blades mounted on the airfoil and being deployable radially outwardly from a retracted position to a deployed position;
    the blades being deployable about a common pivot axis oriented substantially parallel to a longitudinal axis of the aircraft;
    the deployed blades being movable between a fanned arrangement and a stacked arrangement in a manner to vary a yawing moment of the aircraft.

9. The aircraft of claim 8 wherein the airfoil is a wing.

10. The aircraft of Claim 8 wherein the airfoil is comprised of a pair of wings each having a fan control effector mounted thereon in symmetrical arrangement about the longitudinal axis of the aircraft.

11. The aircraft of claim 8 wherein the blades are deployable from at least one of an upper and a lower side of the airfoil.

12. The aircraft of claim 8 wherein:
    the blades are independently deployable radially outwardly from the airfoil.

13. The aircraft of claim 12 wherein the blades are deployable sequentially.

14. The aircraft of claim 13 wherein the sequential deployment of the blades comprises an initial deployment of an aft-most one of the blades.

15. The aircraft of claim 8 wherein the aircraft is a tailless aircraft.

16. A method of controlling the yaw of an aircraft having at least one wing and a fan control effector disposed thereon, the fan control effector having a plurality of blades, the method comprising the steps of:
    deploying the blades about a common pivot axis oriented substantially parallel to a longitudinal axis of the aircraft from the retracted position to the deployed position such that the blades extend out of the aircraft wing;
    moving the blades between a fanned arrangement and a stacked arrangement in a manner to vary a yawing moment of the aircraft.

17. The method of claim 16 wherein the pivot axis is oriented substantially parallel to the longitudinal axis of the aircraft.

* * * * *